United States Patent
Jaiswal et al.

(10) Patent No.: US 8,073,112 B2
(45) Date of Patent: Dec. 6, 2011

(54) METHOD AND SYSTEM TO MANAGE MULTIPLE IVRS

(75) Inventors: Peeyush Jaiswal, Boca Raton, FL (US); Naveen Narayan, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 729 days.

(21) Appl. No.: 12/166,899

(22) Filed: Jul. 2, 2008

(65) Prior Publication Data

US 2010/0002850 A1  Jan. 7, 2010

(51) Int. Cl.
*H04M 1/64* (2006.01)
*G10L 11/06* (2006.01)

(52) U.S. Cl. ............... 379/88.04; 379/88.01; 379/88.13; 379/88.16; 379/88.22; 379/93.08; 379/235; 379/265.02; 370/352; 704/231; 704/246; 704/270; 709/217; 709/246

(58) Field of Classification Search ............... 379/88.01, 379/88.04, 88.13, 88.16, 88.22, 235, 265.02, 379/93.08; 704/231, 246, 270; 370/352; 709/217, 246

See application file for complete search history.

(56) References Cited

U.S. PATENT DOCUMENTS

| | | | | |
|---|---|---|---|---|
| 5,592,538 A * | 1/1997 | Kosowsky et al. | ......... | 379/93.08 |
| 5,802,526 A * | 9/1998 | Fawcett et al. | ............. | 379/88.13 |
| 5,946,377 A * | 8/1999 | Wolf | ........................... | 379/88.22 |
| 6,182,045 B1 * | 1/2001 | Kredo et al. | .................. | 704/270 |
| 6,421,427 B1 | 7/2002 | Hill et al. | | |
| 6,459,776 B1 * | 10/2002 | Aktas et al. | ................ | 379/88.13 |
| 6,970,915 B1 * | 11/2005 | Partovi et al. | ................. | 709/217 |
| 7,054,811 B2 * | 5/2006 | Barzilay | ........................ | 704/246 |
| 7,180,985 B2 * | 2/2007 | Colson et al. | ............... | 379/88.16 |
| 7,415,537 B1 * | 8/2008 | Maes | ............................ | 709/246 |
| 7,778,237 B2 * | 8/2010 | Dowling | ...................... | 370/352 |
| 2001/0055370 A1 * | 12/2001 | Kommer | .................... | 379/88.01 |
| 2005/0117735 A1 * | 6/2005 | Seidman | ................. | 379/265.02 |
| 2007/0133759 A1 | 6/2007 | Malik et al. | | |
| 2007/0140466 A1 * | 6/2007 | Sharma | ......................... | 379/235 |
| 2007/0192113 A1 | 8/2007 | Sadowski et al. | | |
| 2008/0077402 A1 * | 3/2008 | Dhanakshirur et al. | ....... | 704/231 |
| 2010/0002850 A1 * | 1/2010 | Jaiswal et al. | ............. | 379/88.04 |

* cited by examiner

*Primary Examiner* — Gerald Gauthier
(74) *Attorney, Agent, or Firm* — John Pivnichny; Roberts Mlotkowski Safran & Cole, P.C.

(57) ABSTRACT

A method includes storing a profile associated with a user of a telephone and, based upon the profile, presenting the user with an option to search, browse, subscribe to, or bookmark content provided by a plurality of IVR content providers.

22 Claims, 3 Drawing Sheets

METHOD AND SYSTEM TO MANAGE MULTIPLE IVRS

FIELD OF THE INVENTION

The invention generally relates to interactive voice response (IVR) systems, and more particularly to methods and systems to create personal IVRs using Web 2.0 enabled IVR collaborative technology.

BACKGROUND

Many businesses use interactive voice response (IVR) systems to automatically respond to customer inquiries. For example, a customer can make a telephone call to the IVR system of a business and establish a connection via a public switched telephone network or a cellular telephone network. Once the connection is made, the customer can interact with the IVR system to access desired information such as account balance or to conduct transactions such as transfer between accounts. The caller typically responds to the voice menus of the IVR system by pressing the keypad on his telephone set. Very often such telephone calls are made using the toll-free number associated with the business and the cost of the call is paid by the business.

Consider a user that uses the cell telephone for accessing services. Some of the most commonly used services are: banking; insurance (e.g., auto, home and health); directory assistance (e.g., 411, KIOSK, etc.); travel reservations and enquiry; general utility services (e.g., cell telephone, land line billing, electricity, gas, etc.); and driving directions.

For each of the above-described services, the user has a different toll free number to access each respective service. Typically, the user calls each service at some frequent interval (weekly, bi-weekly, monthly etc), conducts business, and disconnects the call.

In every case, the call placed by the user goes through a carrier (e.g., AT&T (a registered trademark of AT&T Intellectual Property in the United States, other countries, or both)) and into the data center of the service provider from where an IVR application is executed. The user has to physically disconnect the service transaction before making a new service transaction with another vendor. There is no data sharing between the vendors.

Accordingly, there exists a need in the art to overcome the deficiencies and limitations described hereinabove.

SUMMARY

In a first aspect of the invention, there is a method of providing collaborative content to a user. The method includes storing a profile associated with a user of a telephone and, based upon the profile, presenting the user with an option to search, browse, subscribe to, or bookmark content provided by a plurality of IVR content providers.

In another aspect of the invention, there is a method comprising providing a computer infrastructure that operates to: receive specified data formats from a plurality of IVR content providers; receive data corresponding to the specified data formats from a user; store the data in a profile associated with the user; and establish a communication connection between the user and one of the plurality of IVR content providers based upon the data stored in the profile.

In another aspect of the invention, there is a computer program product comprising a computer usable medium having a computer readable program embodied in the medium. The computer readable program, when executed on a computing device, causes the computing device to: store a profile associated with a user of a telephone; receive a call from the telephone; authenticate the user; access the profile based upon the authentication; and establish a communication connection between the telephone and one of a plurality of content providers based upon data stored in the profile. The plurality of content providers comprises different providers of different IVR services.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The invention generally relates to interactive voice response (IVR) systems, and more particularly to methods and systems to create personal IVRs using Web 2.0 enabled IVR collaborative technology. According to aspects of the invention a central host application provides a single interface between a user and plural different IVR content providers. The host and content providers collaborate in a Web 2.0 manner to provide enhanced IVR-type service to the user. For example, in embodiments, a user may access plural IVR services from different content providers by dialing only a single telephone number to the host.

Aspects of the invention build on the idea that mobile telephony today, as a commodity, is cheaply available and can be used to reach a wider audience than the Web. In embodiments, a host service is created that can expose content providers to a caller. A caller only has to subscribe to the single host service. The content providers exist behind the host and could be accessed via the host, and may comprise any type of content provider that callers typically access via IVR, such as, for example: banking; insurance (e.g., auto, home and health); directory assistance (e.g., 411, KIOSK, etc.); travel reservations and enquiry; general utility services (e.g., cell telephone, land line billing, electricity, gas, etc.); and driving directions, etc.

In implementations, a user can access the content providers as services provided by the host using a single access point (e.g., toll free number or URL associated with the host). There can be extensive level of data sharing between the host and the content providers. In embodiments, the IVR applications of the various content providers are coupled with the host by an interface such that they can share contextual and profile data. Such data sharing prevents the user from being authenticated at each entry point, and also allows for mining data for research, cross sell, etc.

In embodiments, the user may search for the service of their preference and add it to their profile. For example, this may either be done over the telephone or using a web site. The profile presented by the user to the host (e.g., when calling for the first time) may be collected based upon a common profile required by the content provider that this host is supporting. The user then has the freedom of invoking any of the content provider applications through the host. Owing to data sharing between the host and the providers, the user need not provide any authentication beyond the entry point into the host.

Figure 1:
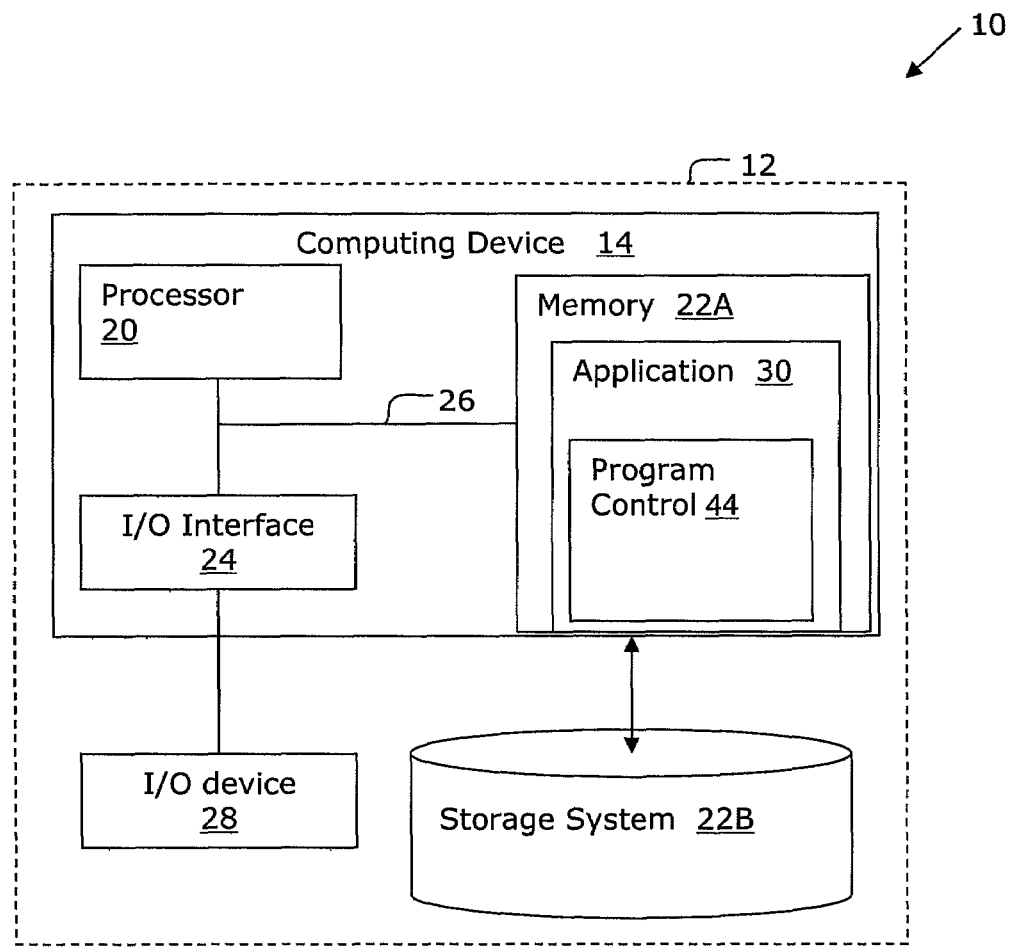
FIG. 1 shows an illustrative environment for implementing the steps in accordance with aspects of the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises an application 30 having a program control 44, which makes the computing device 14 operable to perform the processes described herein, such as, for example, connecting a user to plural IVR content providers in a single call.

The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code (e.g., program control 44) in order to reduce the number of times code must be retrieved from bulk storage during execution. Further, the computing device 14 is in communication with an external I/O device/resource 28 and a storage system 22B. The I/O device 28 can comprise any device that enables an individual to interact with the computing device 14 or any device that enables the computing device 14 to communicate with one or more other computing devices using any type of communications link. The external I/O device/resource 28 may be keyboards, displays, pointing devices, etc.

The processor 20 executes computer program code (e.g., program control 44), which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14.

The computing device 14 can comprise any general purpose computing article of manufacture capable of executing computer program code installed thereon (e.g., a personal computer, server, wireless notebook, smart telephone, personal digital assistant, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the processes described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a primary service provider, such as a Solution Integrator, could offer to perform the processes described herein. In this case, the primary service provider can create, maintain, deploy, support, etc., a computer infrastructure that performs the process steps of the invention for one or more customers. In return, the primary service provider can receive payment from the customer(s) under a subscription and/or fee agreement and/or the primary service provider can receive payment from the sale of advertising content to one or more third parties.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

an electrical connection having one or more wires,
a portable computer diskette,
a hard disk,
a random access memory (RAM),
a read-only memory (ROM),
an erasable programmable read-only memory (EPROM or Flash memory),
an optical fiber,
a portable compact disc read-only memory (CDROM),
an optical storage device, and/or
a transmission media such as those supporting the Internet or an intranet, or a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

Figure 2:
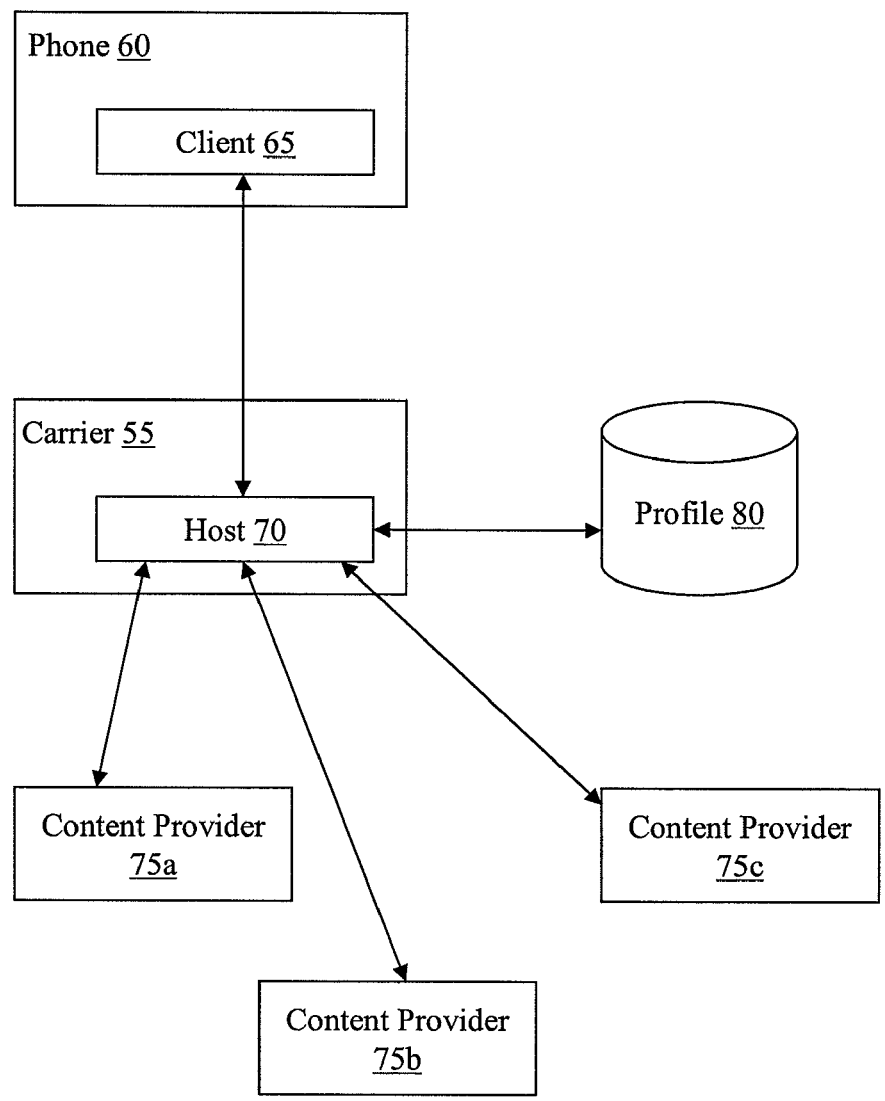
FIG. 2 shows a block diagram of aspects of the invention.

FIG. 2 shows an exemplary system according to aspects of the invention. The system includes a telephone carrier 55 and a telephone 60 of a user. The carrier 55 may comprise, for example, a conventional telecommunications provider (e.g., AT&T) that provides at lest one of: land line (e.g., TDM) telecommunication, wireless telephony, and voice over IP (VoIP). The user telephone 60 may comprise any suitable conventional telephone device that is capable of transmitting data to and receiving data from the telephone carrier 55. For example, the telephone 60 may comprise a land-line telephone, a wireless telephone (e.g., analog or digital), a smart telephone, etc.

According to aspects of the invention, a software client 65 is installed on the telephone 60. The software client 65 may be pre-installed on the telephone 60, or may be, for example, wirelessly downloaded to and installed on the telephone 60. The software client 65 provides programming to the telephone 60 for interacting with a host application 70 (referred to as host 70) associated with the carrier 55 in a manner to carry out the processes described herein.

In embodiments, the carrier 55 includes or has access to the host 70, which includes a program application (e.g., similar to application 30 described with respect to FIG. 1) that functions to perform processes described herein. More specifically, the host 70 facilitates communication between the telephone 60 and content providers 75a, 75b, 75c. Particularly, the host 70 is suitably programmed to store, in a profile 80, data associated with the user of the telephone 60. The host 70 is also programmed to facilitate IVR services from one or more of the content providers 75a-c to the telephone 60 based upon the data in the profile 80. The profile may be stored in memory, such as for example, storage system 22B (described in FIG. 1).

Additionally, the host 70 is programmed to provide the user with enhanced functionality, such as, for example, subscribing to content providers, searching among subscribed-to content providers, browsing content from subscribed-to content providers, bookmarking content, etc., as described in greater detail herein. In this manner, a user of the telephone 60 may access plural IVR services of the various content providers 75a-c by placing only a single call to the host 70. This represents an improvement over previous (i.e., conventional) systems, in which a user has to separately dial each content provider to access the IVR service of the respective content providers.

In embodiments, each content provider (e.g., 75a-c) is any suitable entity that provides IVR-type services to users, customers, etc. For example, a content provider might be a bank that allows an account holder to access certain account functions (e.g., checking account balance, account transfers, etc.) via telephone (e.g., IVR). Similarly, a content provider might be a cable television provider that allows a customer to access certain account functions (e.g., billing statement, due date, etc.) via telephone (e.g., IVR). Although specific examples of content providers are described (e.g., bank, cable television provider, etc.), the invention is not limited to these examples, and any suitable content providers may be used within the scope of the invention. Moreover, the invention is not limited to the number of content providers described herein; rather any suitable number of content providers may interface with the host 70.

According to aspects of the invention, the host 70 and the content providers 75a-c collaborate to define what data should be obtained from the user. For example, a content provider 75a-c may inform the host 70 of specific authentication data that is needed in the profile 80 in order for content provider 75a-c to provide its services to the user via the host 70. Also, the host 70 and the content provider 75a-c may collaborate to share data that is provided to or obtained from the user. For example, the host 70 may be programmed to build contextual relationships and facilitate data sharing between content provider 75a-c. For instance, data entered by a user or spoken by an IVR could be used in a subsequent transaction (e.g., with a different content provider 75a-c), or the context from one application can be used in another application. In this manner, implementations of the invention provide Web 2.0 collaborative features to IVR-type services.

Aspects of the invention can be implemented using traditional TDM or VoIP. This sort of implementation may be suited to a managed service provider, however it can be incorporated by any service provider (e.g., telephone carrier). Implementations of the invention do not place any limitation on the physical placement of any content provider 75a-c, as they can continue to fully leverage any existing infrastructure.

Embodiments of the invention differ from a global IVR of a single content provider 75a-c, in which the single content provider 75a-c provides plural services to a caller. According to aspects of the invention, the content providers 75a-c are separate and distinct from one another, each content provider 75a-c having its own IVR-type service. In implementations of the invention, the host 70 allows these plural, disparate content providers 75a-c to be presented to a user via a single interface (e.g., a single telephone number or URL of the host 70). Moreover, implementations of the invention provide for data sharing between the content providers 75a-c themselves.

In embodiments, the client 65 and host 70 cooperate to allow the user to subscribe to content providers 75a-c. For example, the host 70 may transmit data to the user's telephone specifying a list of available content providers 75a-c to which the user may subscribe (e.g., add to their profile). For example, the host 70 may present a web page to a user's smart telephone, which web page shows a list of content providers 75a-c who are available for this service. Similarly, the host 70 may provide an audio menu to a telephone of a user who dials the host 70 number, the audio menu specifying a list of content providers 75a-c who are available for this service.

According to aspects of the invention, when the user utilizes his or her telephone to select one of the available content providers 75a-c from the list, the host 70 is programmed to ask the user questions to obtain data to populate the user profile. For example, the data sought by the host 70 and stored in the profile is data that the content provider 75a-c requires for granting the user access to the content provider 75a-c service. More specifically, through collaboration between the host 70 and the content provider 75a-c, the content provider 75a-c might require that the host 70 obtain and store a username, account number, and password from the user, and store this data in the user profile. It is noted that username, account number, and password are merely exemplary, and any suitable data may be obtained by the host 70 from the user based upon the requirements of the content provider 75a-c.

In embodiments, the data obtained by the host 70 from the user and stored in the user profile is authentication data for the user to the content provider 75a-c. In this manner, the host 70 can obtain and store different authentication data of the user for different content providers 75a-c. In this manner, after setting up the profile, the user need only connect to the host 70, authenticate to the host 70 (e.g., using a host 70 username, host 70 password, etc.). Once authenticated to the host 70, the user can be connected to the various subscribed-to content providers 75a-c without the user having to authenticate himself or herself to each respective consent provider. Instead, when the user decides to connect to a particular content provider 75a-c, the host 70 authenticates the user to the selected content provider 75a-c using the data stored in the user profile. In this manner, the user can visit numerous content providers 75a-c in a single call to the host 70, while only having to authenticate himself or herself once (to the host 70).

In embodiments, the client 65 and host 70 cooperate to allow the user to search for content amongst profiled content providers 75a-c based on key words. For example, the host 70 may search predefined data provided by the content providers 75a-c for matches to a phrase that is spoken or typed by the user into the telephone. The predefined data may be specified by way of collaboration between the host 70 and the various content providers 75a-c. For example, a content provider 75a-c may define searchable associations with particular content, such as, for example, by associating tags, metadata, etc., with the particular content (e.g., a promotional audio clip). The content provider 75a-c may inform the host 70 of the searchable associations and an identifier of the particular content with which it is associated. When the host 70 determines a match between a search phrase input by the user and a searchable association of a content provider 75a-c (e.g., using conventional search techniques), the host 70 may then establish an appropriate connection between the user and the content provider 75a-c so that the content provider 75a-c may provide the content to the telephone of the user.

In embodiments, the client 65 and host 70 cooperate to allow the user to browse which content providers 75a-c are from subscribed to content providers 75a-c. For example, the host 70 may present a list of available content providers 75a-c to the user when the user connects to the host 70 service. More specifically, when the user connects to the host 70 and authenticates to the host 70, the host 70 may then retrieve the user profile and transmit data to the user telephone (e.g., via IVR menu, browser page on the user smart telephone, etc.), which data specifies a list of the user's subscribed-to content providers 75a-c that the user may choose to connect to.

In another example of browsing, the host 70 may present a list of available content to the user when the user connects to the host 70 service. This available content will be based upon content providers 75a-c that the user has subscribed to through the host 70. As a specific non-limiting example of such browsing, assume that content provider 75a is a bank, content provider 75b is a travel service, content provider 75c is a cable television provider, and that the user is subscribed to all three content providers 75a-c in their profile with the host 70. When the user connects and authenticates to the host 70, the host 70 may automatically present the user with choices of content to browse from each respective content provider 75a-c. For example, the host 70 might present to the user (e.g., via IVR menu, browser page on the user smart telephone, etc.) options such as:

would you like to hear/see your checking account balance from content provider 75a?
would you like to hear/see your itinerary from content provider 75b?
would you like to hear/see your monthly bill from content provider 75c?

In this manner, browsing content from many different providers may be automatically presented to the user based on the user dialing only one telephone number (or entering only one URL) and authenticating only a single time. When a user selects a particular item from the list of browsing content, the host 70 may then establish an appropriate connection between the user and the content provider 75a-c so that the content provider 75a-c may provide the content to the telephone of the user.

According to aspects of the invention, such browsing is facilitated by collaboration between the content providers 75a-c and the host 70. For example, each content provider 75a-c may inform the host 70 what information will be available for browsing to users of the system. Identifying data associated with such content from each respective content provider 75a-c may be stored in the profile. In this way, when the user connects and authenticates to the host 70, the host 70 can automatically present browsing content to the user by accessing the profile.

In embodiments, the client 65 and host 70 provide the ability for the user to define bookmarks (e.g., in their profile) similar to bookmarks in a Web browser. These bookmarks are associated with content (e.g., from a content provider 75a-c) to which the user wishes to have the fastest access. In this manner, after logging in to the host 70, instead of searching or browsing, the user can select a bookmark to gain fast access to the content associated with the bookmark. The bookmark can be stored as data in the profile that points to particular content of a content provider 75a-c. After establishing a connection with the host 70, a bookmark may be selected in any suitable manner, such as, for example, by voice command, keypad, browser, etc. When the user selects a bookmark, the host 70 establishes a connection between the user telephone and the content provider 75a-c based so that the content provider 75a-c can transmit data associated with the bookmark to the user telephone.

Figure 3:
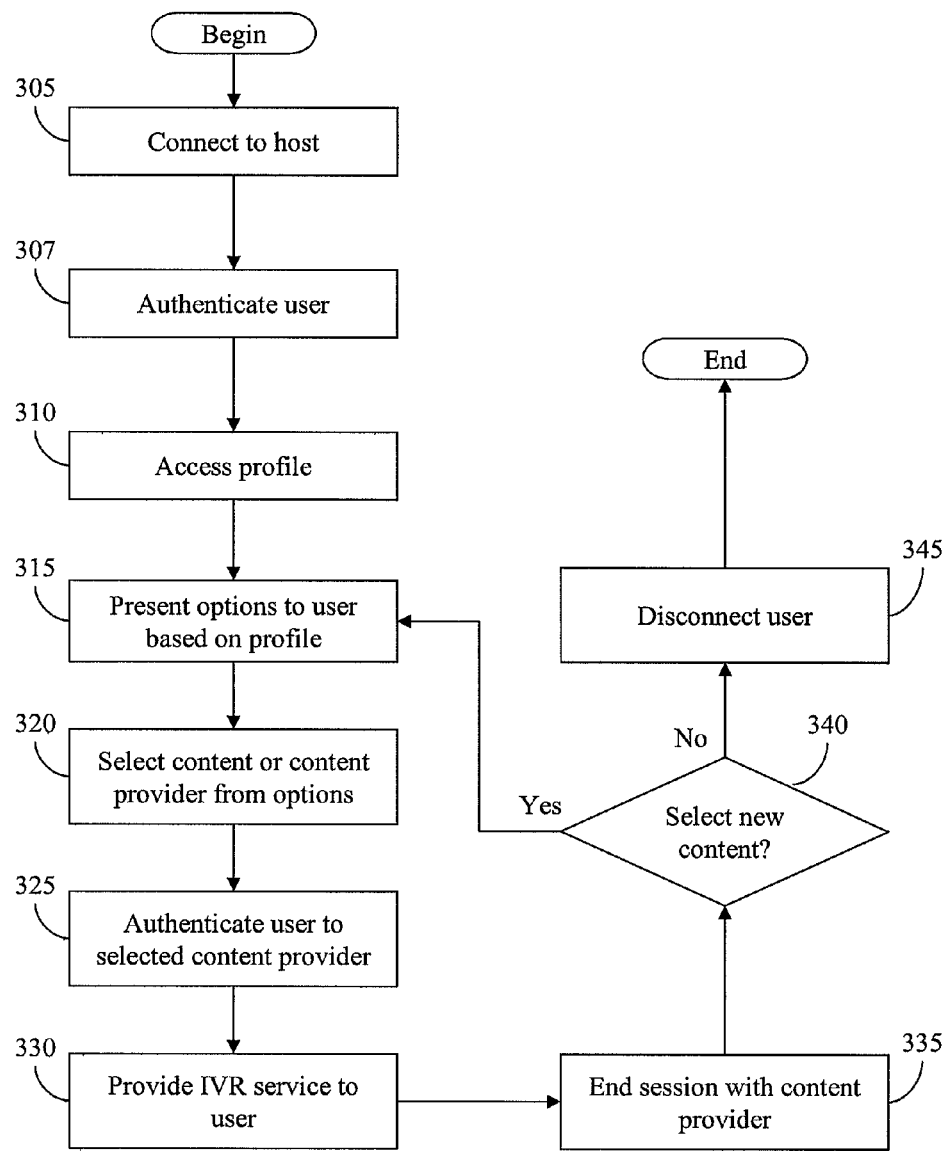
FIG. 3 shows a flow diagram depicting implementations of methods according to aspects of the invention.

FIG. 3 shows a flow diagram implementing aspects of the invention. The steps of the flow diagram described herein may be implemented in the environments of FIGS. 1 and 2. The flow diagram may equally represent a high-level block diagram of the invention. The steps of the flow diagram may be implemented and executed from a server, in a client-server relationship, by computing devices in an ad hoc network, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environments of FIGS. 1 and 2. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk.

Current examples of optical disks include compact disk-read only memory (CD-ROM), compact disk-read/write (CD-R/W) and DVD.

FIG. 3 shows a flow diagram depicting steps of a first method for designing and generating a business application according to aspects of the invention. At step 305 a user utilizes a telephone to connect to a carrier. The telephone and carrier may be those described above with respect to FIG. 2, in which a client (e.g., client 65) is installed on the telephone and the carrier comprises or has access to a host (e.g., host 70). The connection may be established in any suitable fashion, such as, for example, dialing a telephone number, typing a URL, etc.

At step 307, the user utilizes the telephone to authenticate himself or herself to the host. For example, the user may speak or type some sort of authentication information into the telephone, whereby this authentication information is transmitted to the host. The authentication information may be, for example, a username and password that was associated with the user by the host in a previous session between the user and the host.

At step 310, the host accesses a profile associated with the user. The profile may be, for example, the profile (e.g., profile 80) described above with respect to FIG. 2. Particularly, the profile may contain data related to the user and various content providers to which the user is subscribed.

At step 315, the host presents service options to the user via the telephone. This may comprise, for example, the host transmitting data to the telephone, wherein the data specifies at least one of browsing, searching, subscribing, and bookmark functions already described herein. The data may be transmitted in the manner of an IVR or web page to which the user has the ability to respond using the telephone. The options may comprise, for example, a list of content or content providers that the user is subscribed to.

At step 320, the user utilizes the telephone to select a particular content or content provider from the options presented in step 315. This may be performed similar to the manner described above with respect to FIG. 2. For example, the user may speak, type, or use a browser cursor to select an option that was previously presented to the user in step 315. The selection is transmitted to the host via the connection between the carrier and the telephone.

At step 325, based upon the selection of step 320, the host authenticates the user to a particular content provider. This may be performed similar to the manner described above with respect to FIG. 2. For example, based upon the user selection of content provider A, the host may obtain the user's username and password associated with content provider A and stored in the profile. The host may then transmit this data to content provider A on behalf of the user.

At step 330, the content provider of step 325 provides an IVR service to the user via the connection through the host 70. This may be performed similar to the manner described above with respect to FIG. 2. For example, at this point, the content provider may provide its standard IVR service to the user by transmitting data to and/or receiving data from the user telephone. Additionally or alternatively, the content provider may provide a modified content to the user, wherein the content is modified based upon information obtained from the host or from another content provider.

At step 335, the user ends the IVR session with the content provider, while remaining connected to the host. This may be performed, for example, by selecting (e.g., via voice, browser, etc.) an option from the content provider IVR session that signals the content provider to end the session and return the user to the host.

At step 340, the user decides whether to begin a new session with another content provider. For example, the host may present the user with an option to begin a session with another content provider or terminate the call. If the user chooses no, then the host terminates the connection between the telephone and the carrier at step 345. However, if the user chooses yes, then the process returns to step 315, where the host presents the user options for accessing content of subscribed to content providers. In this manner, the user may access plural different content providers by connecting and authenticating only a single time to the host.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, where applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed:

1. A method of providing collaborative content to a user, comprising:
    storing a profile associated with a user of a telephone; and
    based upon the profile, presenting the user with an option to search, browse, subscribe to, and bookmark content provided by a plurality of IVR content providers.

2. The method of claim 1, wherein:
    the storing is performed by a host, and
    the presenting is performed by the host transmitting data to a software client installed on the telephone.

3. The method of claim 2, wherein the host is maintained or accessed by a telecommunications carrier associated with the telephone.

4. The method of claim 2, further comprising, during a single call from the telephone to the host:
    connecting the user to a first one of the plurality of IVR content providers; and
    connecting the user to a second one of the plurality of IVR content providers.

5. The method of claim 1, wherein a service provider at least one of creates, maintains, deploys and supports a computer infrastructure that performs at least one of the steps of claim 1.

6. The method of claim 1, wherein at least one of the steps of claim 1 are provided by a service provider under a subscription and/or fee agreement and/or based on advertising content to one or more third parties.

7. The method of claim 1, further comprising, during a single call from the telephone:
   connecting the user to a first one of the plurality of IVR content providers;
   authenticating the user to the first one of the plurality of IVR content providers using first authentication data stored in the profile; and
   connecting the user to a second one of the plurality of IVR content providers; and
   authenticating the user to the second one of the plurality of IVR content providers using second authentication data stored in the profile.

8. A method of providing collaborative content to a user, comprising:
   storing a profile associated with a user of a telephone;
   based upon the profile, presenting the user with an option to search, browse, subscribe to, or bookmark content provided by a plurality of IVR content providers, wherein the storing is performed by a host, and the presenting is performed by the host transmitting data to a software client installed on the telephone;
   during a single call from the telephone to the host:
      connecting the user to a first one of the plurality of IVR content providers; and
      connecting the user to a second one of the plurality of IVR content providers,
   wherein:
      the connecting the user to the first one of the plurality of IVR content providers comprises authenticating the user to the first one of the plurality of IVR content providers using first authentication data stored in the profile, and
      the connecting the user to the second one of the plurality of IVR content providers comprises authenticating the user to the second one of the plurality of IVR content providers using second authentication data stored in the profile.

9. The method of claim 8, wherein the host receives and stores the first authentication data and the second authentication data in the profile.

10. The method of claim 8, wherein:
   a first format of the first authentication data is specified to the host by the first one of the plurality of IVR content providers; and
   a second format of the second authentication data is specified to the host by the second one of the plurality of IVR content providers.

11. A method, comprising:
   providing a computer infrastructure that operates to:
      receive specified data formats from a plurality of IVR content providers;
      receive data corresponding to the specified data formats from a user;
      store the data in a profile associated with the user;
      establish a communication connection between the user and one of the plurality of IVR content providers based upon the data stored in the profile; and
      present the user with an option to bookmark and at least one of search, browse, and subscribe to content available from the plurality of IVR content providers.

12. The method of claim 11, wherein the presenting the user with the option to bookmark and at least one of search, browse, and subscribe is performed by a host communicating with a software client installed in a telephone of the user.

13. The method of claim 12, wherein the host performs at least one of the receiving specified data formats, receiving data, storing, and establishing.

14. The method of claim 11, wherein the computer infrastructure further operates to allow communication between respective ones of the plurality of IVR content providers.

15. The method of claim 14, wherein the communication is associated with information received from or provided to the user during a call.

16. The method of claim 11, wherein:
   the establishing is performed during a call from the user to the host, and
   the computer infrastructure further operates to, during the call, establish a communication connection between the user and a second one of the plurality of IVR content providers based upon second data stored in the profile.

17. The method of claim 11, wherein a service provider at least one of creates, maintains, deploys and supports the computer infrastructure.

18. The method of claim 11, wherein the computer infrastructure comprises hardware and software.

19. The method of claim 11, wherein the computer infrastructure further operates to, during a single call from the user:
   connect the user to a first one of the plurality of IVR content providers;
   authenticate the user to the first one of the plurality of IVR content providers using first authentication data stored in the profile; and
   connect the user to a second one of the plurality of IVR content providers; and
   authenticate the user to the second one of the plurality of IVR content providers using second authentication data stored in the profile.

20. A computer program product comprising a tangible computer usable medium having a computer readable program embodied in the medium, wherein the computer readable program when executed on a computing device is operable to cause the computing device to:
   store a profile associated with a user of a telephone;
   receive a call from the telephone;
   authenticate the user;
   access the profile based upon the authentication;
   establish a communication connection between the telephone and one of a plurality of content providers based upon data stored in the profile, wherein the plurality of content providers comprises different providers of different IVR services; and
   present the user with an option to bookmark content available from the plurality of content providers.

21. The computer program product of claim 20, wherein:
   the computer readable program comprises a host that performs the storing, receiving, accessing, and establishing, and
   the host interfaces with a software client installed on the telephone to provide searching, subscribing, browsing, and bookmarking options to the user.

22. The computer program product of claim 20, the computing device is further operable to, during the call from the telephone:
   connect the user to a first one of the plurality of content providers;
   authenticate the user to the first one of the plurality of content providers using first authentication data stored in the profile; and
   connect the user to a second one of the plurality of content providers; and
   authenticate the user to the second one of the plurality of content providers using second authentication data stored in the profile.

* * * * *